United States Patent
Tuason et al.

(10) Patent No.: US 10,694,765 B2
(45) Date of Patent: Jun. 30, 2020

(54) WATER-DISPERSIBLE COMPOSITIONS FOR FOOD APPLICATIONS

(75) Inventors: Domingo Tuason, Bensalem, PA (US); Michael Cammarata, Fallsington, PA (US); Gregory Krawczyk, Princeton Junction, NJ (US); Zheng Tan, Mason, OH (US)

(73) Assignee: DUPONT NUTRITION USA, INC., Wilmington, DE (US)

( * ) Notice: Subject to any disclaimer, the term of this patent is extended or adjusted under 35 U.S.C. 154(b) by 0 days.

(21) Appl. No.: 12/974,418

(22) Filed: Dec. 21, 2010

(65) Prior Publication Data

US 2011/0151097 A1 Jun. 23, 2011

Related U.S. Application Data

(60) Provisional application No. 61/289,205, filed on Dec. 22, 2009.

(51) Int. Cl.
| | | |
|---|---|---|
| A23G 9/34 | (2006.01) | |
| A23L 2/52 | (2006.01) | |
| A23L 2/66 | (2006.01) | |
| A23L 29/238 | (2016.01) | |
| A23L 29/244 | (2016.01) | |

(Continued)

(52) U.S. Cl.
CPC .......... *A23G 9/34* (2013.01); *A23L 2/52* (2013.01); *A23L 2/66* (2013.01); *A23L 27/60* (2016.08); *A23L 29/212* (2016.08); *A23L 29/238* (2016.08); *A23L 29/244* (2016.08); *A23L 29/262* (2016.08); *A23V 2002/00* (2013.01)

(58) Field of Classification Search
USPC ........................................................ 426/570
See application file for complete search history.

(56) References Cited

U.S. PATENT DOCUMENTS

| | | |
|---|---|---|
| 3,573,058 A | 3/1971 | Tiemstra |
| 4,263,334 A | 4/1981 | McGinley et al. |

(Continued)

FOREIGN PATENT DOCUMENTS

| | | | | |
|---|---|---|---|---|
| EP | 0913406 A1 | 5/1999 | | |
| EP | 0796868 | * 7/2005 | ............... | A23L 1/24 |

(Continued)

OTHER PUBLICATIONS

Rai et al., Prediction of the viscosity of clarified fruit juice . . . , Table 1, 2005.*

(Continued)

*Primary Examiner* — Erik Kashnikow
*Assistant Examiner* — Lela S. Williams

(57) ABSTRACT

A method of making a water-dispersible composition comprises coprocessing a microcrystalline cellulose wetcake and at least one starch by co-attrition to form an admixture comprising colloidal microcrystalline cellulose and said at least one starch. The admixture is subsequently dried. Optionally, the admixture may be combined with an additional hydrocolloid, such as a galactomannan, before or after drying. A dried colloidal microcrystalline cellulose composition may then be dispersed in an aqueous media to form the food/beverage product. In particular, the composition may be dispersed in an aqueous media containing, for example, a protein to form a low pH beverage composition.

17 Claims, 1 Drawing Sheet

(51) Int. Cl.
*A23L 27/60* (2016.01)
*A23L 29/212* (2016.01)
*A23L 29/262* (2016.01)

(56) References Cited

U.S. PATENT DOCUMENTS

| | | | |
|---|---|---|---|
| 4,693,728 A * | 9/1987 | Clare et al. | 8/561 |
| 4,865,867 A | 9/1989 | Platt et al. | |
| 4,980,193 A * | 12/1990 | Tuason et al. | 426/654 |
| 4,990,355 A | 2/1991 | Gupta et al. | |
| 5,011,704 A | 4/1991 | Smagula et al. | |
| 5,192,569 A | 3/1993 | McGinley et al. | |
| 5,366,742 A | 11/1994 | Tuason, Jr. et al. | |
| 5,415,804 A | 5/1995 | Minami et al. | |
| 5,709,896 A | 1/1998 | Hartigan et al. | |
| 5,769,934 A | 6/1998 | Ha et al. | |
| 5,789,004 A | 8/1998 | Hogan et al. | |
| 5,922,379 A * | 7/1999 | Wang | 426/138 |
| 6,025,007 A | 2/2000 | Krawczyk | |
| 6,391,368 B1 | 5/2002 | Tuason | |
| 6,391,369 B1 | 5/2002 | Tuason et al. | |
| 6,440,474 B1 | 8/2002 | Tuason, Jr. et al. | |
| 6,706,697 B1 * | 3/2004 | MacDonald | 514/57 |
| 7,462,232 B2 | 12/2008 | Tuason et al. | |
| 2004/0009285 A1 | 1/2004 | Antheunisse et al. | |
| 2005/0233046 A1 * | 10/2005 | Krawczyk et al. | 426/573 |
| 2006/0096500 A1 * | 5/2006 | Tuason et al. | 106/162.1 |
| 2006/0178343 A1 * | 8/2006 | Shimotoyodome et al. | 514/60 |
| 2006/0240148 A1 | 10/2006 | Nguyen et al. | |
| 2008/0050497 A1 | 2/2008 | Mai et al. | |
| 2008/0233260 A1 | 9/2008 | Woo et al. | |
| 2008/0254194 A1 | 10/2008 | Anton et al. | |
| 2008/0260908 A1 | 10/2008 | Mutilangi et al. | |
| 2011/0294904 A1 * | 12/2011 | Thoorens | A61K 9/1623 514/781 |

FOREIGN PATENT DOCUMENTS

| | | |
|---|---|---|
| GB | 1010477 A1 | 11/1965 |
| JP | 55024136 | 2/1980 |
| JP | 04-108347 | 4/1992 |
| JP | 2007-124954 | 5/2007 |
| WO | WO 90/14017 | 11/1990 |
| WO | WO-2007054274 | 5/2007 |
| WO | WO 2009-072869 A1 | 6/2009 |

OTHER PUBLICATIONS

Notification of Transmittal of the International Search Report and The Written Opinion of the International Searching Authority, or the Declaration, International Application No. PCT/US2010/061511, dated Dec. 21, 2010.

* cited by examiner

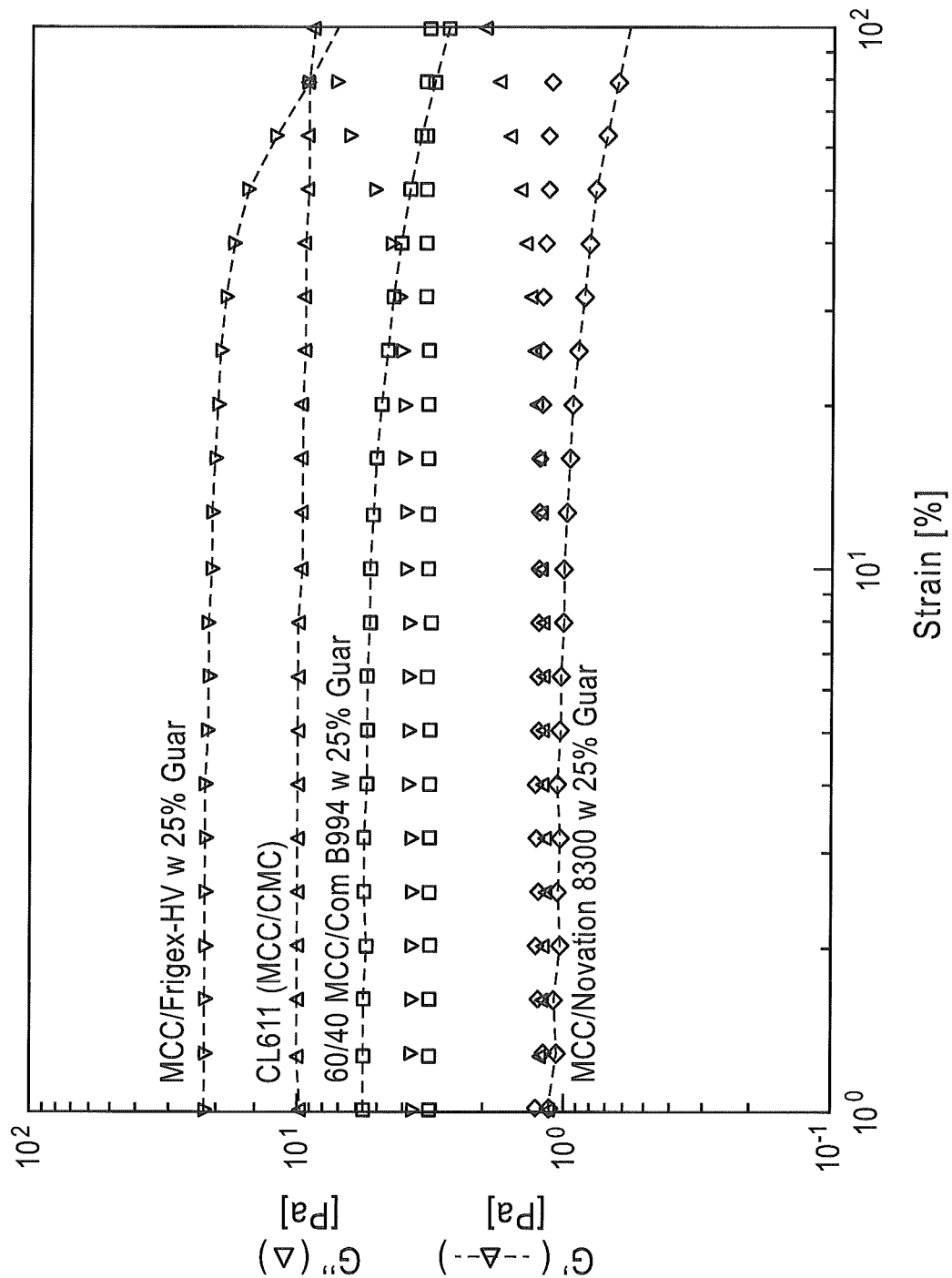

WATER-DISPERSIBLE COMPOSITIONS FOR FOOD APPLICATIONS

FIELD OF THE INVENTION

The invention relates to microcrystalline cellulose compositions for use in food applications.

BACKGROUND OF THE INVENTION

Microcrystalline cellulose (MCC) is used in the food industry to enhance the properties or attributes of a final food product. For example, MCC has been used as a dispersion and suspension aid for suspending solids in aqueous media. In particular, MCC compositions have been developed for enhanced texture or "mouth-feel" in food applications. In U.S. Pat. No. 3,573,058, microcrystalline cellulose is co-dried with a substantial amount of protective hydrocolloid, such as gelatin, alginate, and the like to form a co-dried product that can vary the texture of mouth-feel of food products into which the product is incorporated. U.S. Pat. No. 5,192,569 describes a fat-like bulking agent for aqueous foods made from a microcrystalline cellulose intimately admixed with a galactomannan gum, such as guar gum, in an aqueous medium, which is then dried.

There has been a need, however, to obtain a microcrystalline cellulose composition which exhibits a broader range of mouth-feel properties in different food and beverage applications, such as low pH and neutral pH food applications. It is also desirable that these mouth-feel properties may be tailored based on the sensory properties desired in the final product. In addition, the microcrystalline cellulose composition should have good stability and shelf life properties.

SUMMARY OF THE INVENTION

The microcrystalline cellulose compositions of the present invention may exhibit a broader range of mouth-feel properties and also have high stability/shelf life. Also, the microcrystalline cellulose compositions can readily disperse in an aqueous media to form an ultrafine particulate suspension. This is particularly useful in food applications, such as protein-based beverage applications, fruit pulp suspensions, ice cream, cooking cream, etc. Aspects of the present invention include water-dispersible microcrystalline cellulose compositions and methods of making the same and low pH beverage compositions and methods of making the same.

According to an embodiment of the present invention, a water-dispersible composition, for example, for use in a food application, may be prepared by coprocessing a microcrystalline cellulose wetcake and at least one starch by co-attrition to form an admixture comprising colloidal microcrystalline cellulose and said at least one starch. The admixture is subsequently dried. In a preferred embodiment, the at least one starch is a tapioca starch. Optionally, the admixture may be combined with an additional hydrocolloid, such as a galactomannan, before or after drying. For example, the microcrystalline cellulose composition may be blended with the additional hydrocolloid or dispersed in water with an additional hydrocolloid and subsequently co-dried.

According to another embodiment of the present invention, a composition for use in a food application, such as ice cream, cooking cream, etc., comprises a coprocessed admixture of colloidal microcrystalline cellulose wetcake and at least one tapioca starch or starch derivative, wherein the colloidal microcrystalline cellulose is at least partially coated by the at least one tapioca starch or starch derivative.

According to another embodiment of the present invention, a water-dispersible composition comprises a coprocessed admixture of colloidal microcrystalline cellulose wetcake and at least one starch where the colloidal microcrystalline cellulose is at least partially coated by a barrier dispersant comprising the at least one starch. Optionally, the water-dispersible composition may have an additional hydrocolloid adsorbed thereon. Additionally, the dried colloidal microcrystalline cellulose composition may be dispersed in an aqueous media.

According to another embodiment of the present invention, a low pH beverage composition having a pH of less than about 5 comprises a colloidal microcrystalline cellulose which is at least partially coated by a barrier dispersant comprising at least one low pH stable starch; a galactomannan; a protein; and an aqueous media.

According to another embodiment of the present invention, a method of making a low pH beverage composition comprises dispersing a coprocessed admixture of colloidal microcrystalline cellulose and a starch, a galactomannan, and a protein in an aqueous media, wherein the colloidal microcrystalline cellulose is at least partially coated by a barrier dispersant comprising a low pH stable starch.

BRIEF DESCRIPTION OF THE DRAWING

The invention may be further understood by reference to a drawing in which FIG. 1 depicts a graph of gel strength for MCC/Starch/Guar Gum compositions according to certain embodiments of the invention.

DETAILED DESCRIPTION OF THE INVENTION

The present invention encompasses a water-dispersible colloidal microcrystalline cellulose composition, which is effective as a stabilizer in edible food products, such as low-pH beverage compositions comprising the microcrystalline cellulose composition, a galactomannan, and a protein.

As used herein, "colloid" and "colloidal" are used interchangeably to define particles that may be suspended in a mixture. As known to those of ordinary skill in the art, colloidal particles are of a certain average particle size, for example on the order of about 0.1 to 10 microns. The colloidal particles described herein may be of any suitable particle size as long as they are able to form colloidal suspensions.

As used herein, "hydrocolloid" is intended to encompass the colloidal particles that may be dispersed in an aqueous system and/or a colloid system with the particles dispersed in the aqueous media.

As used herein, unless specified otherwise, the values of the constituents or components of the compositions are expressed in weight percent or % by weight of each ingredient in the composition.

In one embodiment of the present invention, a method of making a water-dispersible composition comprises coprocessing a microcrystalline cellulose wetcake and at least one starch by co-attrition to form an admixture comprising colloidal microcrystalline cellulose and said at least one starch. The admixture is subsequently dried.

In another embodiment of the present invention, a water-dispersible composition for use in a food application comprises a coprocessed admixture of colloidal microcrystalline cellulose wetcake and at least one starch, wherein the colloidal microcrystalline cellulose is at least partially coated by a barrier dispersant comprising the at least one starch.

Any microcrystalline cellulose may be employed in compositions of the present invention. Microcrystalline cellulose (MCC) may comprise tiny rodlike microcrystals of partially hydrolyzed cellulose (beta-1,4 glucan). The beta-1,4 glucan may be derived from any desired chemical degradation method applied to a selected cellulose material. Upon completion of the desired degradation, the residue may be collected as a filter cake and may be thoroughly washed to remove impurities. The washed cake, preferably containing about 40% solids, may then be subjected to mechanical disintegration. In the chemical degradation treatment and subsequent washing, microcrystalline cellulose may be freed by cleaving the cellulose chains in the amorphous regions. The individual crystallites then may be separated or peeled from the treated fiber or fragment. During the disintegration, newly created surfaces are formed as the microcrystals are separated from the degraded material, and unless the individual microcrystals are maintained in a separated condition they will re-bond. In order to obtain efficient shearing, the solids content of the mass being subjected to disintegration should be sufficiently high to provide an efficient transfer of the shear forces. On the other hand, the solids content should not be so high as to allow the separated micro-crystals to coalesce and form large aggregates owing to insufficient water present to hydrate with the newly created surfaces of the microcrystals.

The mechanical attrition may be effected by the use of various standard equipment such as kitchen mixers, planetary mixers, ball mills, attrition mills, high-speed shearing devices such as a Waring blender, and the like. Additionally, the residue of the hydrolysis treatment preferably in the presence of an aqueous medium, may be subjected to a shearing action and to a rubbing action between the particles by forcing the mixture of residue and aqueous medium through passages of limited cross-section such as those found in perforated plates. The attrition should be sufficient to produce a mass wherein at least about 1% by weight, and preferably at least 30% by weight, of the particles have an average length not greater than about 1.0 micron as determined by electron microscopic examination. Some of the particles in such a mass, however, may have a length or maximum dimension as low as a few hundredths of a micron.

The microcrystalline cellulose may be in any suitable form. The microcrystalline cellulose is preferably in the form of a wetcake. A microcrystalline cellulose wetcake is a microcrystalline cellulose that has been manufactured in a wet form, e.g., containing water, and has not been dried ("never dried"). In other words, a microcrystalline cellulose wetcake is microcrystalline cellulose that has not been previously dried and re-hydrated with water. In an embodiment of the present invention, the MCC wetcake has a solids content of about 36-44% solids (or about 56-64% water). The MCC wetcake may be colloidal prior to and/or subsequent to coprocessing. In other words, colloidal grades of MCC may be prepared, for example, by mechanically attriting the wetcake, directly after known hydrolysis, filtration, and washing steps. The particle size of the colloidal microcrystalline cellulose is not particularly limited.

The water in the MCC wetcake or any additional water present in the final admixture may be present in an amount less than 75% water by weight. In one embodiment, the water content during coprocessing is in an amount of about 30-70% water by weight of the admixture, more preferably about 35-50% water. Thus, the admixture preferably comprises some water, e.g., in the wetcake, but not too much. Preferably, sufficient water is present to impart a paste-like consistency to the admixture. Greater than 75% by weight water preferably should not be present during the coprocessing step. In other words, the MCC and starch should not be diluted with excess water when being coprocessed. In particular, the MCC wetcake and starch preferably should not be mixed together with water in an amount sufficient to form a slurry. Without wishing to be bound to a particular theory, it is believed that if too much water is present in the MCC and starch mixture, then sufficient attrition may not occur during coprocessing and the performance of the resulting water-dispersible composition may be adversely affected.

The at least one starch may be any suitable starch, e.g., native starch, or starch derivative known to one skilled in the art and may come from any source, e.g., wheat, corn, oat, rice, tapioca, potato, etc. While the starch may have any suitable amylose content, in a preferred embodiment, the starch has a low amylose content because amylose has the tendency to retrograde (can come together and form some bonds that will force out the water). As a result, the starch may lose its water absorbing properties. Chemically, physically, or genetically modified forms of starch may also be used. For example, the at least one starch may be selected from the group consisting of hydroxyalkyl starch, hydroxyethylated starch, hydroxypropylated starch, acyl starch, and mixtures thereof. In a preferred embodiment, the chemically modified starches are derived from hydroxyalkyl substituted starches, with low to medium cross-links (or no cross-links), such as by phosphates or other common chemical crosslinking means. In one embodiment, the at least one starch comprises tapioca starch, corn starch, derivatives thereof, and mixtures thereof.

In an exemplary embodiment, the starch comprises a high amylo pectin starch, such as tapioca (also known as Cassava or Manioc). In one embodiment, the starch includes or is a tapioca-based starch. The tapioca-based starch may be an unmodified tapioca (e.g., native tapioca starch) or a tapioca derivative. In a preferred embodiment, the starch is a tapioca derivative, such as a modified tapioca starch comprising a hydroxypropyl diphosphate tapioca starch, a hydroxypropyl tapioca starch, or mixtures thereof, for example.

In one embodiment, the at least one starch is present in an amount of about 25-70% by weight of the water-dispersible composition, more preferably about 35-60% by weight of the MCC composition. During coprocessing of the colloidal microcrystalline cellulose wetcake and at least one starch, the starch may be present in an amount of about 10-35% (in another embodiment, about 20-30%) by weight of the admixture.

In one embodiment of the present invention, the starch is a hydroxyalkyl starch, such as a $C_2$-$C_5$ hydroxyalkyl starch. The hydroxyalkylation of a native starch can be brought about by reacting a native starch with alkylene oxides with the appropriate number of carbon atoms. Without wishing to be bound to a particular theory, it is believed that the formation of a hydroxyl group, which is bound to the starch backbone via an alkyl group with 2 to 5 carbon atoms, may lead to a desired hydrophilic-lipophilic balance of the starch. The position of the hydroxyl group on the alkyl group is not critical and may be in the alpha to omega position. The degree of substitution, the average number of substituted OH groups of the starch molecule per anhydroglucose unit, of the hydroxyalkylation is preferably approximately 0.08 to 0.3. Particularly preferred starches are hydroxyethylated and/or hydroxypropylated starches obtained by reacting starches with ethylene oxide or propylene oxide, respectively. A starch to be used according to the invention can also contain more than one hydroxyl group per alkyl group. Hydroxypropylation of starches (degree of substitution determines the number of functional groups) may provide certain useful properties, such as freeze-thaw stability, eliminate retrogradation issues, etc. in various food systems.

In another embodiment of the present invention, the starch is a acyl starch, such as a $C_2$-$C_{18}$ acyl starch. Acylation generally takes place by reaction with acid anhydrides of general formula $(R-C(O))_2O$, in which R is an alkyl group, such as methyl or ethyl; suitable acid anhydrides include, but are not limited to, succinic and maleic anhydride and their alkylated derivatives. $C_2$-$C_{18}$ acyl starch may be brought about by crosslinking with $C_2$-$C_{18}$ alkanoate or alkenoate and may be additionally acylated for a suitable hydrophilic-lipophilic balance with a degree of substitution of 0 to 0.8, particularly 0 to 0.5.

In a preferred embodiment, the starch is a chemically modified cross-linked starch. A preferred crosslinking method is phosphorylation, in which the starch (such as a hydroxyalkylated starch) is reacted with phosphorous oxychloride, phosphorous pentoxide, and/or sodium trimetaphosphate. Two starch chains are crosslinked by an anionic P—O group. Another preferred crosslinking method is by using $C_4$-$C_{18}$ alkane or alkene dicarboxylic acids, preferably $C_4$-$C_8$ alkane dicarboxylic acids, and in particular, adipic acid. The alkane or alkene dicarboxylic acid links two starch chains via ester bonds. It may be in straight or branched chain form. The derivatives may be obtained, e.g., by reacting the starch with the mixed anhydrides of dicarboxylic acid and acetic acid. Based on the dry starch, in general less than 0.1 wt. %, normally about 0.06 wt. %, of cross-linking agent is used.

Chemically modified starches may either be non-gelatinized or pre-gelatinized, with the former preferred.

In low pH applications, the starch is preferably a food-grade modified low pH stable starch. As the name implies, the starch is "food-grade" because it is deemed suitable for human consumption, the starch is "modified" as in chemically modified and/or cross-linked, and is "low pH stable" meaning it is stable in acidic conditions. In an embodiment of the present invention, the starch derivative is selected from the group consisting of a hydroxypropyl di-starch phosphate, an acetylated di-starch adipate, and a sodium hydroxypropyl starch phosphate. In a preferred embodiment, the food-grade modified low pH stable starch is a modified tapioca starch, a modified corn starch, and mixtures thereof. The modified tapioca starch may include, for example, a hydroxypropyl diphosphate tapioca starch, a hydroxypropyl tapioca starch, and mixtures thereof.

In a preferred embodiment, the food-grade modified low pH stable starch is hydroxypropyl distarch phosphate, which is a low pH crosslinked hydroxypropylated starch (containing, for example, 24% amylose and 76% amylopectin). A suitable hydroxypropyl distarch phosphate starch is available, for example, as PURE GEL™ B-994 from Grain Processing Corporation with headquarters in Muscatine, Iowa. Without wishing to be bound to a particular theory, crosslinking with phosphoryl oxychloride at a high pH (for example, pH 11) may produce a distarch phosphate that is heat, shear, and acid stable. In other words, the starch granules remain intact and are not ruptured under high shear conditions and maintain their water absorbing properties under low pH conditions. Accordingly, a greater crosslinking may be desirable for certain low pH food applications because the starch is more acid stable with more crosslinking.

The colloidal microcrystalline cellulose may be at least partially coated by a barrier dispersant comprising the at least one starch. The MCC and starch are intimately associated with one another. The colloidal microcrystalline cellulose wetcake is coprocessed with the starch to cause the starch to at least partially if not fully surround the microcrystalline cellulose particles. In other words, the starch acts as a barrier dispersant for the microcrystalline cellulose wetcake so that the particles of microcrystalline cellulose do not aggregate together. For example, the starch sits on the outer surface of the MCC particles. Without the use of the starch as a barrier dispersant, the microcrystalline cellulose would aggregate and clump together hindering dispersibility of the MCC when added to an aqueous media.

According to one embodiment of the present invention, a composition for use in a food application, such as ice cream, cooking cream, etc., comprises a coprocessed admixture of colloidal microcrystalline cellulose wetcake and at least one tapioca starch or starch derivative, wherein the colloidal microcrystalline cellulose is at least partially coated by the at least one tapioca starch or starch derivative.

In another embodiment of the present invention, a water-dispersible composition for use in a food application comprises a coprocessed admixture of colloidal microcrystalline cellulose wetcake and an acid stable hydrocolloid, wherein the colloidal microcrystalline cellulose is at least partially coated by a barrier dispersant comprising the acid stable hydrocolloid. The acid stable hydrocolloid may be a low pH stable starch.

As discussed above, the MCC is in wetcake form as opposed to being dried or re-hydrated MCC. Due to the form of the raw materials and the processing conditions in combining the MCC and starch, the colloidal microcrystalline cellulose is at least partially coated or is fully coated by the starch, which acts as a barrier dispersant. The starch may be allowed to hydrate by interacting with the water in the MCC wetcake. In a preferred embodiment, the MCC and starch are coprocessed using medium or high shear conditions to minimize the microcrystalline cellulose aggregates and form the coating of starch on the surface of the microcrystalline cellulose. Suitable medium to high shear conditions may be obtained, for example, by co-extruding the MCC wetcake and starch in an extruder. The MCC and starch are not mixed together by adding the MCC and starch to water, e.g., to form a slurry or by re-hydrating a dried MCC and then adding the starch. In other words, the MCC wetcake does not need to be diluted with water, and is preferably not diluted with water, when coprocessed with the starch. Without wishing to be bound to a particular theory, it is believed that if too much water is present in the MCC and starch mixture, then sufficient attrition will not occur.

In an embodiment of the present invention, the coprocessed admixture of colloidal microcrystalline cellulose wetcake and at least one starch is dried. The drying may be carried out by a variety of means, such as by oven, freeze, spray, drum, flash, fluidized bed, vacuum, or thermal reactor drying. The drying may remove water from the composition to obtain a product that would be recognized by one skilled in the art as a "dried" product. The dried water-dispersible composition comprises the coprocessed admixture of colloidal microcrystalline cellulose and starch.

In an embodiment of the present invention, the at least one starch is present in an amount of about 20% to 70% by weight of the co-processed admixture of colloidal microcrystalline wetcake and starch. In other embodiments, the at least one starch is preferably present in an amount of about 30 to 60%, or more preferably in an amount of about 35% to 50%.

Without wishing to be bound by theory, it is believed that the MCC/starch admixture has a greater negative surface charge as opposed to microcrystalline cellulose particles alone (i.e., MCC not coated with starch). This is particularly relevant in low pH food applications because it is desired that the hydrocolloid provides a sufficient surface charge in a high ionic environment (i.e., as encountered in a low pH environment). In a preferred embodiment for low pH applications, it is believed that the low pH modified starch provides the negative surface charge needed to result in a stable colloidal suspension. Thus, the negative surface charge prevents flocculation (i.e., where colloids fall out of suspension in the form of flocs or flakes) in a low pH environment.

The water-dispersible composition may have an additional hydrocolloid adsorbed thereon. In other words, the water-dispersible microcrystalline cellulose composition may further comprise an additional hydrocolloid. Such hydrocolloids include, but are not limited to, seaweed polysaccharides such as carrageenan, agar, furcellaran, alginate, and alginate derivatives, such as propylene glycol alginate (PGA) and monovalent salts of alginates, such as the potassium and sodium salts, plant gums including galactomannans, such as guar, locust bean gum, and tara, carboxymethyl guar, carboxymethyl locust bean gum, glucomannans, such as konjac, tamarind seed, polysaccharide, pectins, including high and low methoxyl pectins and acetylated pectins such as beet pectin, karaya, acacia, tragacanth, starch, bacterial polysaccharides such as xanthan and pullulan, gellan and wellan, cellulose gums, alkyl cellulose ethers including methyl cellulose, hydroxypropylmethyl cellulose, hydroxyethyl cellulose, hydroxymethyl cellulose and hydroxypropyl cellulose, and mixtures thereof. In an exemplary embodiment of the present invention, the additional hydrocolloid is a galactomannan. In a preferred embodiment of the present invention, the additional hydrocolloid is a guar gum. The guar gum may be of varying molecular weight, hydrolyzed or derivatized.

The water-dispersible composition may be dried with or without the additional hydrocoiloid. The drying may be carried out by a variety of means, such as by oven, freeze, spray, drum, flash, fluidized bed, vacuum, or thermal reactor drying. The dried water-dispersible composition may comprise the coprocessed admixture of colloidal microcrystalline cellulose wetcake, starch, and optionally, the additional hydrocolloid, such as galactomannan. In a preferred embodiment, the admixture of microcrystalline cellulose and starch is mixed with guar gum in water and the resulting mixture is spray dried. In other words, the microcrystalline cellulose/starch composition and guar gum are co-spray dried.

In one embodiment, the additional hydrocolloid is present at about 10% to 30% by weight of the composition containing the coprocessed MCC/starch admixture. In another embodiment, the additional hydrocolloid may be present at about 20 to 25% by weight of the composition.

In one embodiment, the additional hydrocolloid and the coprocessed microcrystalline cellulose and at least one starch may be present in amounts such that the weight ratio of the additional hydrocolloid and the coprocessed microcrystalline cellulose and at least one starch is within the range of about 1:9 to 3:7. In another embodiment, the weight ratio of the additional hydrocolloid and the coprocessed microcrystalline starch is within the range of about 1:4 to 1:3.

The water-dispersible composition may be dispersed in an aqueous environment. Due to the barrier dispersant effect of the starch, the MCC is not aggregated and may be readily dispersed in an aqueous solution. In particular, the MCC/starch admixture may be dispersed in water to form a hydrocolloid. It is envisioned, however, that any suitable aqueous solution may be used. Without wishing to be bound to a particular theory, it is believed that preserving the hydrated form of the starch on the surface of the individual particles of MCC enhances the dispersibility of the MCC in water to form an aqueous suspension.

The water-dispersible composition imparts at least one of protein stability, serum stability, heat stability, texture modification, foam stability, enhanced starch properties, or viscosity control in a food product. As discussed above, the MCC, starch, and optionally, galactomannan admixture has a greater negative surface charge. Protein typically has a positive surface charge at acidic conditions below its isoelectric point. Thus, the water-dispersible composition improves protein stability due to the charge interactions between the composition and the protein (e.g., there is no sedimentation of the protein). Similarly, the MCC composition imparts serum stability (which may be considered a type of protein stability). Particularly at a low pH, the charge on the protein causes the protein to slightly separate from the remainder of the suspension and form a serum. Thus, the serum stability results in minimal or no separation of the protein from the top of the suspension. In a preferred embodiment, when the composition comprises galactomannan, the composition imparts further improved serum stability for the hydrocolloid. The composition imparts heat stability by maintaining the colloidal suspension even at elevated temperatures. Texture modification would vary depending on the type of colloidal system (e.g., mouth-feel). Foam stability would include the ability of the hydrocolloid to entrap air or another gaseous agent. Enhanced starch properties would be apparent to one or ordinary skill in the art and would include properties, such as a "starchy" taste, the stability of the starch (e.g., the starch does not retrograde), etc. Viscosity control would depend on the end use of the food product (e.g., low viscosity beverage vs. a high viscosity cultured product).

Potential uses for this product are in food applications where heat stability (baked goods applications, low moisture food systems, etc.), texture modification (salad dressings, mayonnaise, sauces, cultured products, etc.), foam stability (aerated food products and the like) enhanced starch properties (high temperature stability, resistant to low pH, etc.) and suspension of solids (chocolate drinks), are important functional properties. Other potential uses are as a suspending agent in pharmaceutical applications and viscosity control stabilizer (toothpaste, lotions, and creams) in industrial/cosmetic applications. Thus, the food application may include a low pH (e.g., pH less than about 5) beverage (e.g., soy-based), a neutral (e.g., pH of about 5-7) beverage, a juice, a chocolate drink, a dairy product (e.g., frozen yogurt, ice cream), a filling, a pudding, a baked good, a frozen dessert, cooking cream, dessert cream, a sauce, a dressing, a mayonnaise, a cultured product (e.g., sour cream/yogurt, yogurt drinks), or an aerated food product.

In one embodiment of the present invention, a method of making a water-dispersible composition comprises coprocessing a microcrystalline cellulose wetcake and at least one starch by co-attrition to form an admixture comprising colloidal microcrystalline cellulose and said at least one starch. The admixture is subsequently dried. The coprocessing of the microcrystalline cellulose wetcake and starch may occur using any equipment/techniques suitable to form an admixture of colloidal microcrystalline cellulose and starch where there is at least a partial or a full surface coating of the starch on the colloidal microcrystalline cellulose. The microcrystalline cellulose wetcake and starch may be coprocessed using medium or high shear conditions to minimize the microcrystalline cellulose aggregates and form the coating of starch on the surface of the microcrystalline cellulose. Suitable medium to high shear conditions may be obtained, for example, by co-extruding, milling, kneading, or otherwise intimately mixing the MCC wetcake and starch. In a preferred embodiment, the coprocessing is co-extrusion of the MCC and starch in an extruder to form an extrudate. The coprocessing, e.g., coextrusion, of the MCC wetcake and starch may occur without adding water to the mixture. In an embodiment, the MCC wetcake has a solids content of about 36-44% solids. The resulting admixture may optionally be dried using any suitable techniques known to those of ordinary skill in the art. In one embodiment of the invention, the extrudate is dispersed in water and the resulting dispersion is then dried (for example, by spray drying).

The coprocessing step may be a single-step process. In a preferred embodiment, the MCC wetcake and starch are co-attrited. Thus, the MCC and starch may be coprocessed to form a co-attrited mixture of the two components. As used herein, the terms "co-attrited" and "co-attrition" are used interchangeably to mean a process that effectively reduces the size of at least some if not all of the particles to a colloidal size (e.g., MCC is reduced to colloidal size). In a preferred embodiment, the process is a mechanical process, such as co-extrusion, that introduces shear to the admixture of MCC and starch. For example, a wet mechanical disintegration (e.g., attrition) may break up the cellulose aggregates to release the microcrystals. The microcrystals may then be co-processed with a barrier dispersant, to keep the microcrystals from reaggregating during the drying process. In another embodiment, the MCC wetcake is attrited separately, which is mixed with starch, which may also be separately attrited. Due to the coprocessing, the MCC and starch are intimately mixed together. In other words, multiple steps are not required to form the MCC/starch composition of the present invention. Alternatively, the coprocessing step may include co-attriting the MCC and starch to form an admixture and drying the admixture, for example, using a co-spray drying technique.

The admixture of colloidal microcrystalline cellulose and at least one starch may be further blended with an additional hydrocolloid, e.g., galactomannan. The additional hydrocolloid (e.g., a galactomannan) may be blended with the dried MCC/starch composition using any suitable mixing techniques known to those of ordinary skill in the art. Alternatively, the additional hydrocolloid may be dispersed in water with the MCC/starch composition to form a dispersion, and subsequently dried to obtain a dried colloidal microcrystalline cellulose composition comprising colloidal microcrystalline cellulose, starch, and the additional hydrocolloid, e.g., galactomannan. The drying may be carried out by a variety of means, such as by oven, freeze, spray, drum, flash, fluidized bed, vacuum, or thermal reactor drying. In a preferred embodiment, the dispersion is co-spray dried to form a powder. The spray drying allows for rapid drying at a higher surface area. The resulting powder may be dispersed in water. In other words, the dried colloidal microcrystalline cellulose composition is dispersible in an aqueous media. Due to the conditions described herein, the MCC composition is uniformly and readily dispersed in the resulting aqueous suspension.

According to another embodiment of the present invention, a food or beverage composition comprises a colloidal microcrystalline cellulose which is at least partially coated by a barrier dispersant comprising at least one low pH stable starch; a galactomannan; a suspended particulate; and an aqueous media. One or more suspended particulates, such as a protein, a natural or synthetic fruit pulp, or the like, may be included in a food or beverage composition.

In another embodiment of the present invention, a low pH beverage composition comprises a colloidal microcrystalline cellulose which is at least partially coated by a barrier dispersant comprising at least one low pH stable starch, a galactomannan, a protein, and an aqueous media. The low pH beverage has an acidic pH of less than about 5. In one embodiment, the co-spray dried MCC, starch, and galactomannan composition may be combined in an aqueous system with a protein and optionally other ingredients, such as juice, flavoring, etc. A method of making a low pH beverage composition comprises dispersing a colloidal microcrystalline cellulose and starch composition, a galactomannan, and a protein in an aqueous media, wherein the colloidal microcrystalline cellulose is at least partially coated by a barrier dispersant comprising a low pH stable starch.

In an exemplary embodiment, a low pH beverage composition comprises a colloidal microcrystalline cellulose which is at least partially coated by a barrier dispersant comprising hydroxypropyl distarch phosphate; a guar gum; a soy protein; and an aqueous media, wherein the low pH beverage has a pH of less than about 5.

Proteins suitable for use in the present invention include food proteins and amino acids, which are beneficial to mammals, birds, reptiles, fish, and other living organisms. Food proteins include animal or plant proteins and fractions or derivatives thereof. Plant derived proteins include nut and nut derived proteins, sorghum, legume and legume derived proteins such as soy and soy derived products such as untreated fresh soy, fluid soy, soy concentrate, soy isolate, soy flour, and rice proteins, and all forms and fractions thereof. Animal derived proteins include milk and milk derived products, such as heavy cream, light cream, whole milk, low fat milk, skim milk, fortified milk including protein fortified milk, processed milk and milk products including superheated and/or condensed, sweetened or unsweetened skin milk or whole milk, dried milk powders including whole milk powder and nonfat dry milk (NFDM), casein and caseinates, whey and whey derived products such as whey concentrate, delactosed whey, demineralized whey, whey protein isolate. Egg and egg-derived proteins may also be used. Food proteins may be used in any available form, including liquid, condensed, or powdered. When using a powdered protein source, however, it may be desirable to prehydrate the protein source prior to blending with the microcrystalline cellulose composition. Any suitable amounts of protein may be used based upon the desired end result.

In a preferred embodiment, the protein is selected from the group consisting of soy protein, legume protein, pea protein, rapeseed protein, canola protein, corn protein, wheat gluten, vegetable whey protein, whey, dairy whey, casein, and mixtures thereof.

The relative insolubility of proteins in an aqueous acidic environment has been a hurdle to adding protein to acidic beverages. Most commonly used proteins, such as soy proteins and casein, have an isoelectric point at an acidic pH. Thus, the proteins are least soluble in an aqueous liquid at or near the pH of acidic beverages. For example, soy protein has an isoelectric point at pH 4.5 and casein has an isoelectric point at a pH of 4.7, while most common juices have a pH in the range of 3.7 to 4.0. As a result, protein tends to settle out as sediment in an acidic protein-containing beverage. This sedimentation is an undesirable quality in a beverage. The colloidal microcrystalline cellulose, starch, and optional additional hydrocolloid composition described herein, however, has been found to stabilize the proteins in such an acidic aqueous suspension to form a superior beverage product.

The water-dispersible microcrystalline cellulose composition may also comprise additional ingredients, such as juice. Suitable juices may include fruit juices (including but not limited to lemon juice, lime juice, and orange juice, including variations such as lemonade, limeade, or orange-ade, white and red grape juices, grapefruit juice, apple juice, pear juice, cranberry juice, blueberry juice, raspberry juice, cherry juice, pineapple juice, pomegranate juice, mango juice, apricot juice or nectar, strawberry juice, kiwi juice, and naranjadas) and vegetable juices (including but not limited to tomato juice, carrot juice, celery juice, beet juice, parsley juice, spinach juice, and lettuce juice). The juices may be in any form, including liquid, solid, or semi-solid forms such as gels or other concentrates, ices or sorbets, or powders, and may also contain suspended solids.

Any resulting food or beverage composition may include any number of other components, such as acidulants, sweeteners, buffering agents, pH modifiers, pH buffers, stabilizing salts, flavorings, colorings, preservatives, nutritional supplements, process aids, and the like.

The colloidal composition described herein could work effectively for high or low viscosity food applications. Higher viscosity food applications, e.g., sour cream, are less likely to exhibit flocculation behavior. However, it is more difficult to maintain the stability of a low pH beverage of lower viscosity because of an increased flocculation effect. The MCC/starch composition described herein, however, enables effective suspension and protein protection in low pH protein-based juice beverages. In a preferred embodiment of the present invention, the low pH beverage composition has a low viscosity, e.g., of less than about 100 cp at about room temperature. In other words, the beverage has a flowable/drinkable consistency and yet still maintains a uniform dispersion. The MCC/starch composition may also exhibit a certain gel strength (i.e., the ability to form gels) depending on the application. The rheology of the finished co-processed product may also be measured to determine the gel strength. In an exemplary embodiment, the coprocessed admixture and/or resulting food product has a gel strength of about 2 pascal (Pa) or higher, preferably about 5 Pa or higher.

It will be recognized that the weight percents of the ingredients in the MCC composition and the food and beverage products may be adjusted accordingly to maintain the desired results, such as protein stability. Such routine adjustment of the composition is fully within the capabilities of one having skill in the art and is within the scope and intent of the present invention.

EXAMPLES

The stability guidelines used herein are based on storing the beverage at the temperature specified (or at room temperature if unspecified) for six weeks. The product was deemed to pass the stability test if there was less than 5 mm of serum and no sedimentation. The beverages were also qualitatively critiqued for good overall flowability, consistency, and mouth-feel of the beverage (e.g., there was little or no gelatinizing or thickening of the beverage).

Example 1: 60/40 MCC/Low pH Modified Starch

In a 5 gallon Hobart mixer, 860.8 grams of microcrystalline cellulose (MCC) wetcake was admixed with 257.2 grams low pH modified starch to obtain a MCC to low pH modified starch solids ratio of 60/40 parts by weight. The admixture was passed through a co rotating twin-screw extruder several times to shear the admixture and comminute the microcrystalline aggregates. The resulting consistency of the extrudate was not slippery thereby enabling it to be subjected to a high work profile, which facilitated the formation of colloidal microcrystalline cellulose particles.

279.51 grams of the MCC/low pH modified starch extrudate was dispersed in 2720.49 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

The resulting powder was dispersed in water using a 40 fluid ounce Waring blender (rheostat setting of 110V for 5 minutes). Microscope evaluation of the resulting dispersion revealed that the MCC particles were effectively comminuted and uniformly dispersed.

Example 2: Soy Protein Beverages—Low pH Beverage

Samples were prepared using 0.45% of a 60:40 MCC/Low pH modified starch (INSCOSITY™ B656 obtainable from Grain Processing Corp. with headquarters in Muscatine, Iowa) composition with 0.15% of a food grade guar gum (MULTI-KEM FG 60/70 obtainable from MULTI-KEM Corporation with offices in Ridgefield, N.J.). The low pH beverage formulation comprises the constituents at the weight percentages provided in Table 1.

TABLE 1

| Formulation @ 7.5 g protein/8 oz serving | % by wt. |
| --- | --- |
| Apple Juice conc. (38.5 brix) | 4.50 |
| Sugar | 8.00 |
| Soy Protein Isolate XT 40N | 3.00 |
| TCP (tricalcium phosphate) | 0.10 |
| 60:40 MCC/low pH modified starch | 0.45 |
| MULTI-KEM FG 60/70 Guar Gum | 0.15 |
| DKP (di-potassium phosphate) | 0.20 |
| 50% Citric acid solution | 0.70 |
| Water | to 100% |

The DKP (di-potassium phosphate) was added to 80% of the available water and allowed to mix for 15 minutes. Then, the soy protein isolate was added and the mixture was heated to 155-160° F. and mixed for 15 minutes. Then, the dry mixed sugar and TCP (tricalcium phosphate) was added and mixed an additional 5 minutes. Next, the 60:40 MCC/low pH modified starch powder was dispersed in the mixture while maintaining the temperature of 155-160° F. and mixed for 15 minutes. MULTI-KEM FG 60/70 Guar Gum was then added and mixed until hydrated, or for approximately 10 minutes. The product was then cooled to 100-110° F. The juice concentrate and citric acid was then diluted in the remaining available water and added to the formulation and mixed for 5 minutes. An antifoam agent (HI-MAR S-030-FG at 0.1-0.2% obtainable from OilChem with offices in Lincoln, R.I.) was then added, and adjustments were then made, if needed, for any water loss. Then the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a pH of 4.35 and viscosity of 51.0 cP and passed our stability guidelines after 6 weeks of storage at 4° C.

Example 3: Soy Protein Beverages—Low pH Beverage

Samples were prepared using 0.50% of a 60:40 MCC/Low pH modified starch (INSCOSITY™ B656) composition with 0.15% of added MULTI-KEM FG 60/70 Guar Gum. The low pH beverage formulation comprises the constituents at the weight percentages provided in Table 2.

TABLE 2

| Formulation @ 7.5 g protein/8 oz serving | % by wt. |
| --- | --- |
| Apple Juice conc. (38.5 brix) | 4.50 |
| Sugar | 8.00 |
| Soy Protein Isolate XT 40N | 3.00 |
| TCP | 0.10 |
| 60:40 MCC/low pH modified starch | 0.50 |
| MULTI-KEM FG 60/70 Guar Gum | 0.15 |
| DKP | 0.20 |
| 50% Citric acid solution | 0.70 |
| Water | to 100% |

The DKP was added to 80% of the available water and allowed to mix for 15 minutes. Then, the soy protein isolate was added and the mixture was heated to 155-160° F. and mixed for 15 minutes. Then, the dry mixed sugar and TCP was added and mixed an additional 5 minutes. Next, the 60:40 MCC/low pH modified starch (INSCOSITY™ B656) powder was dispersed in the mixture while maintaining the temperature of 155-160° F. and mixed for 15 minutes. MULTI-KEM FG 60/70 guar gum was then added and mixed until hydrated, or for approximately 10 minutes. The product was then cooled to 100-110° F. The juice concentrate and citric acid was then diluted in the remaining available water and added to the formulation and mixed for 5 minutes. An antifoam agent (HI-MAR S-030-FG at 0.1-0.2%) was then added, and adjustments were then made, if needed, for any water loss. Then, the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a pH of 4.34 and viscosity of 54.0 cP and passed our stability guidelines after 6 weeks of storage at 4° C.

Example 4: 60/40 MCC/Corn Starch NF, PURE-DENT® B700

In a 5 gallon Hobart mixer, 860.8 grams of microcrystalline cellulose (MCC) wetcake was admixed with 254.2 grams natural, non-modified corn starch (PURE-DENT® B700 obtainable from Grain Process Corp. with headquarters in Muscatine, Iowa) to obtain an MCC to starch solids ratio of 60/40 parts by weight. The admixture was passed through a co rotating twin-screw extruder several times to shear the admixture and comminute the microcrystalline aggregates. The resulting consistency of the extrudate was not slippery thereby enabling it to be subjected to a high work profile, which facilitated the formation of colloidal microcrystalline cellulose particles.

278.75 grams of the MCC/starch extrudate was dispersed in 2721.25 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

The resulting powder was dispersed in water using a 40 fluid ounce Waring blender (rheostat setting of 110V for 5 minutes). Microscope evaluation of the resulting dispersion revealed that the MCC particles are effectively comminuted and uniformly dispersed.

Example 5: Soy Protein Beverages—Low pH Beverage

Samples were prepared using 0.50% of a 60:40 MCC/Corn Starch NF (PURE-DENT® B700) composition with 0.15% of added MULTI-KEM FG 60/70 guar gum. The low pH beverage formulation comprises the constituents at the weight percentages provided in Table 3.

TABLE 3

| Formulation @ 7.5 g protein/8 oz serving | % by wt. |
| --- | --- |
| Apple Juice conc. (38.5 brix) | 4.50 |
| Sugar | 8.00 |
| Soy Protein Isolate XT 40N | 3.00 |
| TCP | 0.10 |
| 60:40 MCC/Corn Starch NF (B700) | 0.50 |
| MULTI-KEM FG 60/70 Guar Gum | 0.15 |
| DKP | 0.20 |
| 50% Citric acid solution | 0.70 |
| Water | to 100% |

The DKP was added to 80% of the available water and allowed to mix for 15 minutes. Then, the soy protein isolate was added and the mixture was heated to 155-160° F. and mixed for 15 minutes. Then, the dry mixed sugar and TCP was added and mixed an additional 5 minutes. Next, the 60:40 MCC/Corn Starch NF powder was dispersed in the mixture while maintaining the temperature of 155-160° F. and mixed for 15 minutes. MULTI-KEM FG 60/70 guar gum was then added and mixed until hydrated, or for approximately 10 minutes. The product was then cooled to 100-110° F. The juice concentrate and citric acid was then diluted in the remaining available water and added to the formulation and mixed for 5 minutes. An antifoam agent (HI-MAR S-030-FG at 0.1-0.2%) was then added, and adjustments were then made, if needed, for any water loss. Then, the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a pH of 4.34 and viscosity of 125.0 cP and failed our stability guidelines after 1 week of storage at 4° C. Although the product failed the stability guidelines for the low pH beverage, a pure corn starch may work effectively for a neutral pH beverage or other food application.

Example 6: 60/40 MCC/Low pH Modified Starch

In a 5 gallon Hobart mixer, 860.8 grams of microcrystalline cellulose (MCC) wetcake was admixed with 255.3 grams low pH modified starch (PURE GEL™ B-994 from Grain Processing Corporation with headquarters in Muscatine, Iowa) to obtain an MCC to low pH modified starch solids ratio of 60/40 parts by weight. The admixture was passed through a co rotating twin-screw extruder several times to shear the admixture and comminute the microcrystalline aggregates. The resulting consistency of the extrudate was not slippery thereby enabling it to be subjected to a high work profile, which facilitated the formation of colloidal microcrystalline cellulose particles.

279.04 grams of the MCC/low pH modified starch extrudate was dispersed in 27220.96 grams of distilled water. The resulting slurry was passed through a Manton Gaulin homogenizer at 2,500 psi, buffered to a pH of ~8.0 using $K_2CO_3$, heated to 185° F. for 5 minutes, and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

The resulting powder was dispersed in water using a 40 fluid ounce Waring blender (rheostat setting of 110V for 5 minutes). Microscope evaluation of the resulting dispersion revealed that the MCC particles are effectively comminuted and uniformly dispersed.

Example 7: Soy Protein Beverages—Low pH Beverage

Samples were prepared using 0.45% of a 60:40 MCC/Low pH modified starch (PURE GEL™ 994) composition with 0.15% of added MULTI-KEM FG 60/70 guar gum. The low pH beverage formulation comprises the constituents at the weight percentages provided in Table 4.

TABLE 4

| Formulation @ 7.5 g protein/8 oz serving | % by wt. |
|---|---|
| Apple Juice conc. (38.5 brix) | 4.50 |
| Sugar | 8.00 |
| Soy Protein Isolate XT 40N | 3.00 |
| TCP | 0.10 |
| 60/40 MCC/low pH modified starch | 0.45 |
| MULTI-KEM FG 60/70 Guar Gum | 0.15 |
| DKP | 0.20 |
| 50% Citric acid solution | 0.70 |
| Water | to 100% |

The DKP was added to 80% of the available water and allowed to mix for 15 minutes. Then, the soy protein isolate was added and the mixture was heated to 155-160° F. and mixed for 15 minutes. Then, the dry mixed sugar and TCP was added and mixed an additional 5 minutes. Next, the 60:40 MCC/low pH modified starch (PURE GEL™ 8994) powder was dispersed in the mixture while maintaining the temperature of 155-160° F. and mixed for 15 minutes. MULTI-KEM FG 60/70 Guar Gum was then added and mixed until hydrated, or for approximately 10 minutes. The product was then cooled to 100-110° F. The juice concentrate and citric acid was then diluted in the remaining available water and added to the formulation and mixed for 5 minutes. An antifoam agent (HI-MAR S-030-FG at 0.1-0.2%) was then added, and adjustments were then made, if needed, for any water loss. Then, the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a pH of 4.41 and viscosity of 62.5 cP and passed our stability guidelines after 6 weeks of storage at 4° C.

Example 8: Soy Protein Beverages—Low pH Beverage

Samples were prepared using 0.40% of a 60:40 MCC/Low pH modified starch (PURE GEL™ B994) composition with 0.18% of added MULTI-KEM FG 60/70 Guar Gum. The low pH beverage formulation comprises the constituents at the weight percentages provided in Table 5.

TABLE 5

| Formulation @ 7.5 g protein/8 oz serving | % by wt. |
|---|---|
| Apple Juice conc. (38.5 brix) | 4.50 |
| Sugar | 8.00 |
| Soy Protein Isolate XT 40N | 3.00 |
| TCP | 0.10 |
| 60:40 MCC/low pH modified starch (Pure Gel B994) | 0.40 |
| MULTI-KEM FG 60/70 Guar Gum | 0.18 |
| DKP | 0.20 |
| 50% Citric acid solution | 0.70 |
| Water | to 100% |

The DKP was added to 80% of the available water and allowed to mix for 15 minutes. Then, the soy protein isolate was added and the mixture was heated to 155-160° F. and mixed for 15 minutes. Then, the dry mixed sugar and TCP was added and mixed an additional 5 minutes. Next, the 60:40 MCC/low pH modified starch (PURE GEL™ B994) powder was dispersed in the mixture while maintaining the temperature of 155-160° F. and mixed for 15 minutes. MULTI-KEM FG 60/70 Guar Gum was then added and mixed until hydrated, or for approximately 10 minutes. The product was then cooled to 100-110° F. The juice concentrate and citric acid was then diluted in the remaining available water and added to the formulation and mixed for 5 minutes. An antifoam agent (HI-MAR S-030-FG at 0.1-0.2%) was then added, and adjustments were then made, if needed, for any water loss. Then, the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a pH of 4.51 and viscosity of 56 cP and passed our stability guidelines after 6 weeks of storage at 4° C.

Example 9: Soy Protein Beverages (Low Protein)—Low pH Beverage

Samples were prepared using 0.30% of a 60:40 MCC/Low pH modified starch (PURE GEL™ B994) composition with 0.18% of added PROCOL DP-80 guar gum, obtainable from Polypro International Inc. with offices in Minneapolis, Minn. The low pH beverage formulation comprises the constituents at the weight percentages provided in Table 6.

TABLE 6

| Formulation @ 1.75 g protein/8 oz serving | % by wt. |
| --- | --- |
| Pear Juice conc. (70 brix) | 1.00 |
| Sugar | 8.00 |
| Soy Protein Isolate Supro 783 | 0.69 |
| 60:40 MCC/Low pH modified starch | 0.30 |
| PROCOL DP-80 Guar Gum | 0.18 |
| 50% Citric acid solution | 0.50 |
| Water | to 100% |

The soy protein isolate was added to the water and the mixture was heated to 155-160° F. and mixed for 15 minutes. Next, the 60:40 MCC/Low pH modified starch (PURE GEL™ B994) powder was dispersed in the mixture while maintaining the temperature of 155-160° F. and mixed for 15 minutes. PROCOL DP-80 guar gum was then added and mixed until hydrated, or for approximately 10 minutes. Then, the sugar was added and mixed an additional 5 minutes. The product was then cooled to 100-110° F. The juice concentrate and citric acid solution was then added to the formulation and mixed for 5 minutes. Adjustments were then made, if needed, for any water loss. Then, the product was pasteurized at 250° F. for 6 seconds. The product was then cooled to 165° F. and passed through a Niro homogenizer with a two-stage pressure of 2500 psi (2000 psi, 500 psi). Finally, the mixture was cooled to 20° C. and filled aseptically. The product had a pH of 3.70 and viscosity of 9.0 cP and passed our stability guidelines after 6 weeks of ambient storage.

Example 10: Soy Protein Beverages (Low Protein)—Low pH Beverage

Samples were prepared using 0.35% of a 60:40 MCC/Low pH modified starch (PURE GEL™ B994) composition with 0.18% of added PROCOL DP-80 Guar Gum. The low pH beverage formulation comprises the constituents at the weight percentages provided in Table 7.

TABLE 7

| Formulation @ 1.75 g protein/8 oz serving | % by wt. |
| --- | --- |
| Pear Juice conc. (70 brix) | 1.00 |
| Sugar | 8.00 |
| Soy Protein Isolate Supro 783 | 0.69 |
| 60:40 MCC/Low pH modified starch (Pure Gel B994) | 0.35 |
| PROCOL DP-80 Guar Gum | 0.18 |
| 50% Citric acid solution | 0.50 |
| Water | to 100% |

The soy protein isolate was added to the water and the mixture was heated to 155-160° F. and mixed for 15 minutes. Next, the 60:40 MCC/Low pH modified starch (PURE GEL™ B994) powder was dispersed in the mixture while maintaining the temperature of 155-160° F. and mixed for 15 minutes. PROCOL DP-80 guar gum was then added and mixed until hydrated, or for approximately 10 minutes. Then, the sugar was added and mixed an additional 5 minutes. The product was then cooled to 100-110° F. The juice concentrate and citric acid solution was then added to the formulation and mixed for 5 minutes. Adjustments were then made, if needed, for any water loss. Then, the product was pasteurized at 250° F. for 6 seconds. The product was then cooled to 165° F. and passed through a Niro homogenizer with a two-stage pressure of 2500 psi (2000 psi, 500 psi). Finally, the mixture was cooled to 20° C. and filled aseptically. The product had a pH of 3.40 and viscosity of 15.0 cP and passed our stability guidelines after 6 weeks of ambient storage.

Example 11: Soy Protein Beverages (Low Protein)—Low pH Beverage

Samples were prepared using 0.40% of a 60:40 MCC/Low pH modified starch (PURE GEL™ B994) composition with 0.18% of added PROCOL DP-80 Guar Gum. The low pH beverage formulation comprises the constituents at the weight percentages provided in Table 8.

TABLE 8

| Formulation @ 1.75 g protein/8 oz serving | % by wt. |
| --- | --- |
| Pear Juice conc. (70 brix) | 1.00 |
| Sugar | 8.00 |
| Soy Protein Isolate Supro 783 | 0.69 |
| 60:40 MCC/Low pH modified starch (Pure Gel B994) | 0.40 |
| PROCOL DP-80 Guar Gum | 0.18 |
| 50% Citric acid solution | 0.50 |
| Water | to 100% |

The soy protein isolate was added to the water and the mixture was heated to 155-160° F. and mixed for 15 minutes. Next, the 60:40 MCC/Low pH modified starch (PURE GEL™ 8994) powder was dispersed in the mixture while maintaining the temperature of 155-160° F. and mixed for 15 minutes. PROCOL DP-80 Guar Gum was then added and mixed until hydrated, or for approximately 10 minutes. Then, the sugar was added and mixed an additional 5 minutes. The product was then cooled to 100-110° F. The juice concentrate and citric acid solution was then added to the formulation and mixed for 5 minutes. Adjustments were then made, if needed, for any water loss. Then, the product was pasteurized at 250° F. for 6 seconds. The product was then cooled to 165° F. and passed through a Niro homogenizer with a two-stage pressure of 2500 psi (2000 psi, 500 psi). Finally, the mixture was cooled to 20° C. and filled aseptically. The product had a pH of 3.36 and viscosity of 16.0 cP and passed our stability guidelines after 6 weeks of ambient storage.

Example 12: Soy Protein Beverages (Low Protein)—Low pH Beverage

Samples were prepared using 0.45% of a 60:40 MCC/Low pH modified starch (PURE GEL™ B994) composition with 0.15% of added PROCOL DP-80 Guar Gum. The low pH beverage formulation comprises the constituents at the weight percentages provided in Table 9.

TABLE 9

| Formulation @ 1.75 g protein/8 oz serving | % by wt. |
| --- | --- |
| Pear Juice conc. (70 brix) | 1.00 |
| Sugar | 8.00 |
| Soy Protein Isolate Supro 783 | 0.69 |
| 60:40 MCC/Low pH modified starch (PURE GEL™ B994) | 0.45 |
| PROCOL DP-80 Guar Gum | 0.15 |
| 50% Citric acid solution | 0.50 |
| Water | to 100% |

The soy protein isolate was added to the water and the mixture was heated to 155-160° F. and mixed for 15 minutes. Next, the 60:40 MCC/Low pH modified starch (PURE GEL™ B994) powder was dispersed in the mixture while maintaining the temperature of 155-160° F. and mixed for 15 minutes. PROCOL DP-80 Guar Gum was then added and mixed until hydrated, or for approximately 10 minutes. Then, the sugar was added and mixed an additional 5 minutes. The product was then cooled to 100-110° F. The juice concentrate and citric acid solution was then added to the formulation and mixed for 5 minutes. Adjustments were then made, if needed, for any water loss. Then, the product was pasteurized at 250° F. for 6 seconds. The product was then cooled to 165° F. and passed through a Niro homogenizer with a two-stage pressure of 2500 psi (2000 psi, 500 psi). Finally, the mixture was cooled to 20° C. and filled aseptically. The product had a pH of 3.38 and viscosity of 20.0 cP and passed our stability guidelines after 6 weeks of ambient storage.

Example 13: Buffered 60/40 MCC/Low pH Modified Starch

In a 5 gallon Hobart mixer, 860.8 grams of microcrystalline cellulose (MCC) wetcake was admixed with 257.2 grams low pH modified starch (INSCOSITY B656) to obtain an MCC to low pH modified starch solids ratio of 60/40 parts by weight. The admixture was passed through a co rotating twin-screw extruder several times to shear the admixture and comminute the microcrystalline aggregates. The resulting consistency of the extrudate was not slippery thereby enabling it to be subjected to a high work profile which facilitated the formation of colloidal microcrystalline cellulose particles.

279.51 grams of the MCC/low pH modified starch extrudate was dispersed in 2720.49 grams of distilled water. The resulting slurry was passed through a Manton Gaulin homogenizer at 2,500 psi, buffered to a pH of ~8.0 using $K_2CO_3$, and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

The resulting powder was dispersed in water using a 40 fluid ounce Waring blender (rheostat setting of 110V for 5 minutes). Microscope evaluation of the resulting dispersion revealed that the MCC particles are effectively comminuted and uniformly dispersed.

Example 14: Soy Protein Beverages—Low pH Beverage

Samples were prepared using 0.30% of a buffered 60:40 MCC/Low pH modified starch (INSCOSITY B656) composition with 0.18% of added MULTI-KEM FG 60/70 Guar Gum. The low pH beverage formulation comprises the constituents at the weight percentages provided in Table 10.

TABLE 10

| Formulation @ 7.5 g protein/8 oz serving | % by wt. |
| --- | --- |
| Apple Juice conc. (38.5 brix) | 4.50 |
| Sugar | 8.00 |
| Soy Protein Isolate XT 40N | 3.00 |
| TCP | 0.10 |
| buffered 60:40 MCC/Low pH modified starch (INSCOSITY B656) | 0.30 |
| MULTI-KEM FG 60/70 Guar Gum | 0.18 |
| DKP | 0.20 |
| 50% Citric acid solution | 0.70 |
| Water | to 100% |

The DKP was added to 80% of the available water and allowed to mix for 15 minutes. Then, the soy protein isolate was added and the mixture was heated to 155-160° F. and mixed for 15 minutes. Then, the dry mixed sugar and TCP was added and mixed an additional 5 minutes. Next, the buffered 60:40 MCC/Low pH modified starch (INSCOSITY B656) powder was dispersed in the mixture while maintaining the temperature of 155-160° F. and mixed for 15 minutes. MULTI-KEM FG 60/70 Guar Gum was then added and mixed until hydrated, or for approximately 10 minutes. The product was then cooled to 100-110° F. The juice concentrate and citric acid was then diluted in the remaining available water and added to the formulation and mixed for 5 minutes. An antifoam agent (HI-MAR S-030-FG at 0.1-0.2%) was then added, and adjustments were then made, if needed, for any water loss. Then, the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a pH of 4.17 and viscosity of 56.5 cP and passed our stability guidelines after 6 weeks of storage at 4° C.

Example 15: 45/30/25 MCC/Low pH Modified Starch/Guar Gum

In a 5 gallon Hobart mixer, 860.8 grams of microcrystalline cellulose (MCC) wetcake was admixed with 255.3 grams low pH modified starch (INSCOSITY B994) to obtain an MCC to low pH modified starch solids ratio of 60/40 parts by weight. The admixture was passed through a co rotating twin-screw extruder several times to shear the admixture and comminute the microcrystalline aggregates. The resulting consistency of the extrudate was not slippery thereby enabling it to be subjected to a high work profile which facilitated the formation of colloidal microcrystalline cellulose particles.

209.28 grams of the MCC/low pH modified starch extrudate and 41.48 grams of PROCOL DP-80 Guar Gum was dispersed in 2749.24 grams of distilled water. This was done to give a 45/30/25 MCC/low pH modified starch/Guar Gum solids ratio. The resulting slurry was passed through a Manton Gaulin homogenizer at 2,500 psi and spray dried to form a powder. The spray drying was performed as follows: The homogenized slurry was fed to a 3 foot (0.9144 m)

Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

A water dispersible colloidal MCC powder was obtained. When dispersed in deionized water, its 2.6% dispersion exhibited an initial Brookfield viscosity of 2000 cps and a viscosity of 3800 cps when retested after 24 hours.

Example 16: Soy Protein Beverages (Low Protein)—Low pH Beverage

Samples were prepared using 0.60% of a 45/30/25 MCC/low pH modified starch, INSCOSITY B994/Guar Gum, PROCOL DP-80 composition. The low pH beverage formulation comprises the constituents at the weight percentages provided in Table 11.

TABLE 11

| Formulation @ 1.75 g protein/8 oz serving | % by wt. |
| --- | --- |
| Pear Juice conc. (70 brix) | 1.00 |
| Sugar | 8.00 |
| Soy Protein Isolate Supro 783 | 0.69 |
| 45/30/25 MCC/low pH modified starch, INSCOSITY B994/Guar Gum, PROCOL DP-80 | 0.60 |
| 50% Citric acid solution | 0.50 |
| Water | to 100% |

The soy protein isolate was added to the water and the mixture was heated to 155-160° F. and mixed for 15 minutes. Next, the 45/30/25 MCC/low pH modified starch, INSCOSITY B994/Guar Gum, PROCOL DP-80 powder was dispersed in the mixture while maintaining the temperature of 155-160° F. and mixed for 15 minutes. Then, the sugar was added and mixed an additional 5 minutes. The product was then cooled to 100-110° F. The juice concentrate and citric acid solution was then added to the formulation and mixed for 5 minutes. Adjustments were then made, if needed, for any water loss. Then, the product was pasteurized at 250° F. for 6 seconds. The product was then cooled to 165° F. and passed through a Niro homogenizer with a two-stage pressure of 2500 psi (2000 psi, 500 psi). Finally, the mixture was cooled to 20° C. and filled aseptically. The product had a pH of 3.61 and viscosity of 24.0 cP and passed our stability guidelines after 6 weeks of ambient storage.

Example 17: Soy Protein Beverages (Low Protein)—Low pH Beverage

Samples were prepared using 0.40% of a 45/30/25 MCC/low pH modified starch, INSCOSITY B994/Guar Gum, PROCOL DP-80 composition. The low pH beverage formulation comprises the constituents at the weight percentages provided in Table 12.

TABLE 12

| Formulation @ 1.75 g protein/8 oz serving | % by wt. |
| --- | --- |
| Pear Juice conc. (70 brix) | 1.00 |
| Sugar | 8.00 |
| Soy Protein Isolate Supro 783 | 0.69 |
| 45/30/25 MCC/low pH modified starch, INSCOSITY B994/Guar Gum, PROCOL DP-80 | 0.40 |
| 50% Citric acid solution | 0.50 |
| Water | to 100% |

The soy protein isolate was added to the water and the mixture was heated to 155-160° F. and mixed for 15 minutes. Next, the 45/30/25 MCC/low pH modified starch, INSCOSITY B994/Guar Gum, PROCOL DP-80 powder was dispersed in the mixture while maintaining the temperature of 155-160° F. and mixed for 15 minutes. Then, the sugar was added and mixed an additional 5 minutes. The product was then cooled to 100-110° F. The juice concentrate and citric acid solution was then added to the formulation and mixed for 5 minutes. Adjustments were then made, if needed, for any water loss. Then, the product was pasteurized at 250° F. for 6 seconds. The product was then cooled to 165° F. and passed through a Niro homogenizer with a two-stage pressure of 2500 psi (2000 psi, 500 psi). Finally, the mixture was cooled to 20° C. and filled aseptically. The product had a pH of 3.68 and viscosity of 14.0 cP and passed our stability guidelines after 6 weeks of ambient storage.

Example 18: Soy Protein Beverages (Low Protein)—Low pH Beverage

Samples were prepared using 0.40% of a 45/30/25 MCC/low pH modified starch, INSCOSITY B994/Guar Gum, PROCOL DP-80 composition. The low pH beverage formulation comprises the constituents at the weight percentages provided in Table 13.

TABLE 13

| Formulation @ 1.75 g protein/8 oz serving | % by wt. |
| --- | --- |
| Pear Juice conc. (70 brix) | 1.00 |
| Sugar | 8.00 |
| Soy Protein Isolate Supro 783 | 0.69 |
| 45/30/25 MCC/low pH modified starch, INSCOSITY B994/Guar Gum, PROCOL DP-80 | 0.40 |
| 50% Citric acid solution | 0.20 |
| Water | to 100% |

The soy protein isolate was added to the water and the mixture was heated to 155-160° F. and mixed for 15 minutes. Next, the 45/30/25 MCC/low pH modified starch, INSCOSITY B994/Guar Gum, PROCOL DP-80 powder was dispersed in the mixture while maintaining the temperature of 155-160° F. and mixed for 15 minutes. Then, the sugar was added and mixed an additional 5 minutes. The product was then cooled to 100-110° F. The juice concentrate and citric acid solution was then added to the formulation and mixed for 5 minutes. Adjustments were then made, if needed, for any water loss. Then, the product was pasteurized at 250° F. for 6 seconds. The product was then cooled to 165° F. and passed through a Niro homogenizer with a two-stage pressure of 2500 psi (2000 psi, 500 psi). Finally, the mixture was cooled to 20° C. and filled aseptically. The product had a pH of 4.17 and viscosity of 14.0 cP and passed our stability guidelines after 6 weeks of ambient storage.

Example 19: Soy Protein Beverages (Low Protein)—Low pH Beverage

Samples were prepared using 0.50% of a 45/30/25 MCC/low pH modified starch, INSCOSITY B994/Guar Gum, PROCOL DP-80 composition. The low pH beverage formulation comprises the constituents at the weight percentages provided in Table 14.

TABLE 14

| Formulation @ 1.75 g protein/8 oz serving | % by wt. |
| --- | --- |
| Pear Juice conc. (70 brix) | 1.00 |
| Sugar | 8.00 |
| Soy Protein Isolate Supro 783 | 0.69 |
| 45/30/25 MCC/low pH modified starch, INSCOSITY B994/Guar Gum, PROCOL DP-80 | 0.50 |
| 50% Citric acid solution | 0.50 |
| Water | to 100% |

The soy protein isolate was added to the water and the mixture was heated to 155-160° F. and mixed for 15 minutes. Next, the 45/30/25 MCC/low pH modified starch, INSCOSITY B994/Guar Gum, PROCOL DP-80 powder was dispersed in the mixture while maintaining the temperature of 155-160° F. and mixed for 15 minutes. Then, the sugar was added and mixed an additional 5 minutes. The product was then cooled to 100-110° F. The juice concentrate and citric acid solution was then added to the formulation and mixed for 5 minutes. Adjustments were then made, if needed, for any water loss. Then, the product was pasteurized at 250° F. for 6 seconds. The product was then cooled to 165° F. and passed through a Niro homogenizer with a two-stage pressure of 2500 psi (2000 psi, 500 psi). Finally, the mixture was cooled to 20° C. and filled aseptically. The product had a pH of 3.63 and viscosity of 21.5.0 cP and passed our stability guidelines after 6 weeks of ambient storage.

Example 20: Soy Protein Beverages (Low Protein)—Low pH Beverage

Samples were prepared using 0.50% of a 45/30/25 MCC/low pH modified starch, INSCOSITY B994/Guar Gum, PROCOL DP-80 composition. The low pH beverage formulation comprises the constituents at the weight percentages provided in Table 15.

TABLE 15

| Formulation @ 1.75 g protein/8 oz serving | % by wt. |
| --- | --- |
| Pear Juice conc. (70 brix) | 1.00 |
| Sugar | 8.00 |
| Soy Protein Isolate Supro 783 | 0.69 |
| 45/30/25 MCC/low pH modified starch, INSCOSITY B994/Guar Gum, PROCOL DP-80 | 0.50 |
| 50% Citric acid solution | 0.20 |
| Water | to 100% |

The soy protein isolate was added to the water and the mixture was heated to 155-160° F. and mixed for 15 minutes. Next, the 45/30/25 MCC/low pH modified starch, INSCOSITY B994/Guar Gum, PROCOL DP-80 powder was dispersed in the mixture while maintaining the temperature of 155-160° F. and mixed for 15 minutes. Then, the sugar was added and mixed an additional 5 minutes. The product was then cooled to 100-110° F. The juice concentrate and citric acid solution was then added to the formulation and mixed for 5 minutes. Adjustments were then made, if needed, for any water loss. Then, the product was pasteurized at 250° F. for 6 seconds. The product was then cooled to 165° F. and passed through a Niro homogenizer with a two-stage pressure of 2500 psi (2000 psi, 500 psi). Finally, the mixture was cooled to 20° C. and filled aseptically. The product had a pH of 4.19 and viscosity of 24.0 cP and passed our stability guidelines after 6 weeks of ambient storage.

Example 21: 45/30/25 MCC/Low pH Modified Starch/Guar Gum

In a 5 gallon Hobart mixer, 860.8 grams of microcrystalline cellulose (MCC) wetcake was admixed with 255.3 grams low pH modified starch (INSCOSITY B994) to obtain an MCC to low pH modified starch solids ratio of 60/40 parts by weight. The admixture was passed through a co rotating twin-screw extruder several times to shear the admixture and comminute the microcrystalline aggregates. The resulting consistency of the extrudate was not slippery thereby enabling it to be subjected to a high work profile which facilitated the formation of colloidal microcrystalline cellulose particles.

209.28 grams of the MCC/low pH modified starch extrudate and 41.48 grams of PROCOL DP-50 Guar Gum was dispersed in 2749.24 grams of distilled water. This was done to give a 45/30/25 MCC/low pH modified starch/Guar Gum solids ratio. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

A water dispersible colloidal MCC powder was obtained. When dispersed in deionized water, its 2.6% dispersion exhibited an initial Brookfield viscosity of 1010 cps and a viscosity of 3100 cps when retested after 24 hours.

Example 22: Soy Protein Beverages (Low Protein)—Low pH Beverage

Samples were prepared using 0.50% of a 45/30/25 MCC/low pH modified starch, INSCOSITY B994/Guar Gum, PROCOL DP-50 composition. The low pH beverage formulation comprises the constituents at the weight percentages provided in Table 16.

TABLE 16

| Formulation @ 1.75 g protein/8 oz serving | % by wt. |
| --- | --- |
| Pear Juice conc. (70 brix) | 1.00 |
| Sugar | 8.00 |
| Soy Protein Isolate Supro 783 | 0.69 |
| 45/30/25 MCC/low pH modified starch, INSCOSITY B994/Guar Gum, PROCOL DP-50 | 0.50 |
| 50% Citric acid solution | 0.50 |
| Water | to 100% |

The soy protein isolate was added to the water and the mixture was heated to 155-160° F. and mixed for 15 minutes. Next, the 45/30/25 MCC/low pH modified starch, INSCOSITY B994/Guar Gum, PROCOL DP-50 powder was dispersed in the mixture while maintaining the temperature of 155-160° F. and mixed for 15 minutes. Then, the sugar was added and mixed an additional 5 minutes. The product was then cooled to 100-110° F. The juice concentrate and citric acid solution was then added to the formulation and mixed for 5 minutes. Adjustments were then made, if needed, for any water loss. Then, the product was pasteurized at 250° F. for 6 seconds. The product was then cooled to 165° F. and passed through a Niro homogenizer with a two-stage pressure of 2500 psi (2000 psi, 500 psi). Finally, the mixture was cooled to 20° C. and filled aseptically. The product had a pH of 3.65 and viscosity of 24.0 cP and failed according to our stability guidelines after 3 weeks of ambient storage due to serum separation.

Example 23: Soy Protein Beverages (Low Protein)—Low pH Beverage

Samples were prepared using 0.50% of a 45/30/25 MCC/low pH modified starch, INSCOSITY B994/Guar Gum, PROCOL DP-50 composition. The low pH beverage formulation comprises the constituents at the weight percentages provided in Table 17.

TABLE 17

| Formulation @ 1.75 g protein/8 oz serving | % by wt. |
| --- | --- |
| Pear Juice conc. (70 brix) | 1.00 |
| Sugar | 8.00 |
| Soy Protein Isolate Supro 783 | 0.69 |
| 45/30/25 MCC/low pH modified starch, INSCOSITY B994/Guar Gum, PROCOL DP-50 | 0.50 |
| 50% Citric acid solution | 0.20 |
| Water | to 100% |

The soy protein isolate was added to the water and the mixture was heated to 155-160° F. and mixed for 15 minutes. Next, the 45/30/25 MCC/low pH modified starch, INSCOSITY B994/Guar Gum, PROCOL DP-50 powder was dispersed in the mixture while maintaining the temperature of 155-160° F. and mixed for 15 minutes. Then, the sugar was added and mixed an additional 5 minutes. The product was then cooled to 100-110° F. The juice concentrate and citric acid solution was then added to the formulation and mixed for 5 minutes. Adjustments were then made, if needed, for any water loss. Then, the product was pasteurized at 250° F. for 6 seconds. The product was then cooled to 165° F. and passed through a Niro homogenizer with a two-stage pressure of 2500 psi (2000 psi, 500 psi). Finally, the mixture was cooled to 20° C. and filled aseptically. The product had a pH of 4.27 and viscosity of 21.0 cP and failed according to our stability guidelines after 3 weeks of ambient storage due to serum separation.

Comparative Example 24: Soy Protein Beverages—Low pH Beverage

Samples were prepared using 0.15% MULTI-KEM FG 60/70 Guar Gum. The low pH beverage formulation comprises the constituents at the weight percentages provided in Table 18.

TABLE 18

| Formulation @ 7.5 g protein/8 oz serving | % by wt. |
| --- | --- |
| Apple Juice conc. (38.5 brix) | 4.50 |
| Sugar | 8.00 |
| Soy Protein Isolate XT 40N | 3.00 |
| TCP | 0.10 |
| MULTI-KEM FG 60/70 Guar Gum | 0.15 |

TABLE 18-continued

| Formulation @ 7.5 g protein/8 oz serving | % by wt. |
| --- | --- |
| DKP | 0.20 |
| 50% Citric acid solution | 0.70 |
| Water | to 100% |

The DKP was added to 80% of the available water and allowed to mix for 15 minutes. Then, the soy protein isolate was added and the mixture was heated to 155-160° F. and mixed for 15 minutes. Then, the dry mixed sugar and TCP was added and mixed an additional 5 minutes. MULTI-KEM FG 60/70 Guar Gum was then added and mixed until hydrated, or for approximately 10 minutes. The product was then cooled to 100-110° F. The juice concentrate and citric acid was then diluted in the remaining available water and added to the formulation and mixed for 5 minutes. An antifoam agent (HI-MAR S-030-FG at 0.1-0.2%) was then added, and adjustments were then made, if needed, for any water loss. Then the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a pH of 4.18 and viscosity of 27.5 cP and failed our stability guidelines after 1 week of storage at 4° C. due to serum separation.

Comparative Example 25: Soy Protein Beverages—Low pH Beverage

Samples were prepared using 1.00% AMD 783 HM Pectin. The low pH beverage formulation comprises the constituents at the weight percentages provided in Table 19.

TABLE 19

| Formulation @ 7.5 g protein/8 oz serving | % by wt. |
| --- | --- |
| Apple Juice conc. (38.5 brix) | 4.50 |
| Sugar | 8.00 |
| Soy Protein Isolate XT 40N | 3.00 |
| TCP | 0.10 |
| AMD 783 HM Pectin | 1.00 |
| DKP | 0.20 |
| 50% Citric acid solution | 0.70 |
| Water | to 100% |

The DKP was added to 80% of the available water and allowed to mix for 15 minutes. Then, the soy protein isolate was added and the mixture was heated to 155-160° F. and mixed for 15 minutes. Then, the dry mixed sugar and TCP was added and mixed an additional 5 minutes. AMD 783 HM Pectin was then added and mixed until hydrated, or for approximately 10 minutes. The product was then cooled to 100-110° F. The juice concentrate and citric acid was then diluted in the remaining available water and added to the formulation and mixed for 5 minutes. An antifoam agent (HI-MAR S-030-FG at 0.1-0.2%) was then added, and adjustments were then made, if needed, for any water loss. Then the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a pH of 4.17 and viscosity of 91.0 cP and failed our stability guidelines after 1 week of storage at 4° C. due to sedimentation.

Comparative Example 26: Soy Protein Beverages (Low Protein)—Low pH Beverage

Samples were prepared using 0.35% AMD 783 HM Pectin. The low pH beverage formulation comprises the constituents at the weight percentages provided in Table 20.

TABLE 20

| Formulation @ 1.75 g protein/8 oz serving | % by wt. |
| --- | --- |
| Pear Juice conc. (70 brix) | 1.00 |
| Sugar | 8.00 |
| Soy Protein Isolate Supro 783 | 0.69 |
| AMD 783 HM Pectin | 0.35 |
| 50% Citric acid solution | 0.50 |
| Water | to 100% |

The soy protein isolate was added to the water and the mixture was heated to 155-160° F. and mixed for 15 minutes. AMD 783 HM Pectin was then added and mixed until hydrated, or for approximately 10 minutes. Then, the sugar was added and mixed an additional 5 minutes. The product was then cooled to 100-110° F. The juice concentrate and citric acid solution was then added to the formulation and mixed for 5 minutes. Adjustments were then made, if needed, for any water loss. Then, the product was pasteurized at 250° F. for 6 seconds. The product was then cooled to 165° F. and passed through a Niro homogenizer with a two-stage pressure of 2500 psi (2000 psi, 500 psi). Finally, the mixture was cooled to 20° C. and filled aseptically. The product had a pH of 3.58 and viscosity of 7.0 cP and failed according to our stability guidelines after 24 hours of ambient storage due to sedimentation.

Example 27: Soy Protein Beverages (Low Protein)—Low pH Beverage

Samples were prepared using 1.00% of a 60:40 MCC/Low pH modified starch (INSCOSITY B656) composition. The low pH beverage formulation comprises the constituents at the weight percentages provided in Table 21.

TABLE 21

| Formulation @ 7.5 g protein/8 oz serving | % by wt. |
| --- | --- |
| Apple Juice conc. (38.5 brix) | 4.50 |
| Sugar | 8.00 |
| Soy Protein Isolate XT 40N | 3.00 |
| TCP | 0.10 |
| 60:40 MCC/low pH modified starch (INSCOSITY 8656) | 1.00 |
| DKP | 0.20 |
| 50% Citric acid solution | 0.70 |
| Water | to 100% |

The DKP was added to 80% of the available water and allowed to mix for 15 minutes. Then, the soy protein isolate was added and the mixture was heated to 155-160° F. and mixed for 15 minutes. Then, the dry mixed sugar and TCP was added and mixed an additional 5 minutes. Next, the 60:40 MCC/low pH modified starch (INSCOSITY 8656) powder was dispersed in the mixture while maintaining the temperature of 155-160° F. and mixed for 15 minutes. The product was then cooled to 100-110° F. The juice concentrate and citric acid was then diluted in the remaining available water and added to the formulation and mixed for 5 minutes. An antifoam agent (HI-MAR S-030-FG at 0.1-0.2%) was then added, and adjustments were then made, if needed, for any water loss. Then the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a pH of 4.46 and viscosity of 38.5 cP and failed after 24 hours due to serum separation when stored at 4° C. Although the product failed the stability guidelines for the low pH beverage, MCC/low pH modified starch compositions without guar gum may work effectively for a neutral pH beverage or other food application.

Comparative Example 28: Soy Protein Beverages (Low Protein)—Low pH Beverage

The following comparative example does not include starch. Samples were prepared using 0.15% of MULTI-KEM FG 60/70 Guar Gum. The low pH beverage formulation comprises the constituents at the weight percentages provided in Table 22.

TABLE 22

| Formulation @ 7.5 g protein/8 oz serving | % by wt. |
| --- | --- |
| Apple Juice conc. (38.5 brix) | 4.50 |
| Sugar | 8.00 |
| Soy Protein Isolate XT 40N | 3.00 |
| TCP | 0.10 |
| MULTI-KEM FG 60/70 Guar Gum | 0.15 |
| DKP | 0.20 |
| 50% Citric acid solution | 0.70 |
| Water | to 100% |

The DKP was added to 80% of the available water and allowed to mix for 15 minutes. Then, the soy protein isolate was added and the mixture was heated to 155-160° F. and mixed for 15 minutes. Then, the dry mixed sugar and TCP was added and mixed an additional 5 minutes. MULTI-KEM FG 60/70 Guar Gum was then added and mixed until hydrated, or for approximately 10 minutes. The product was then cooled to 100-110° F. The juice concentrate and citric acid was then diluted in the remaining available water and added to the formulation and mixed for 5 minutes. An antifoam agent (HI-MAR S-030-FG at 0.1-0.2%) was then added, and adjustments were then made, if needed, for any water loss. Then, the product was pasteurized at 195° F. for 15 seconds. The product was then cooled to 165° F. and passed through a Manton Gaulin homogenizer with a two-stage pressure of 2500 psi (2000 psi, 500 psi). Finally, the mixture was cooled to 20° C. and filled. The product had a pH of 4.18 and viscosity of 27.5 cP and failed due to serum separation after 1 week when stored at 4° C.

Example 29: 60/40 MCC/Low pH Modified Tapioca Starch

In a 5 gal Hobart mixer, 815.2 grams of microcrystalline cellulose (MCC) wetcake was admixed with 267.6 grams low pH modified tapioca starch to obtain an MCC to low pH modified starch solids ratio of 60/40 parts by weight. The admixture was passed through a co-rotating twin-screw extruder several times to shear the admixture and comminute the microcrystalline aggregates. The resulting consistency of the extrudate was not slippery thereby enabling it to be subjected to a high work profile which facilitated the formation of colloidal microcrystalline cellulose particles.

270.70 grams of the MCC/low pH modified starch extrudate was dispersed in 2729.30 grams of distilled water. The resulting slurry was passed through a Manton Gaulin homogenizer at 2,500 psi and spray dried to form a powder. The spray drying was performed as follows: The homogenized slurry was fed to a 3 foot (0.9144 m) Bowen spray dryer utilizing nozzle atomization 0.1 inch (0.00254 m) opening. The slurry was fed to the dryer by means of a variable feed Moyno pump at a rate to provide the desired outlet temperature. The operating inlet/outlet air temperature of the spray dryer was about 225° F./125° F. The spray drying conditions were regulated depending upon feed properties such as viscosity and resulting dried product characteristics and subsequent yield.

The resulting powder was dispersed in water using a 40 fluid ounce Waring blender (rheostat setting of 110V for 5 minutes). Microscope evaluation of the resulting dispersion revealed that the MCC particles are effectively comminuted and uniformly dispersed.

Example 30: Soy Protein Beverages (Low Protein)—Low pH Beverage

Samples were prepared using 0.45% of a 60:40 MCC/Low pH modified tapioca starch (NATIONAL® FRIGEX HV, a modified food starch derived from tapioca available from National Starch LLC with offices in Bridgewater, N.J.) composition with 0.15% of added PROCOL DP-130 Guar Gum (available from Habgen™ with offices in Pakistan).

| Formulation @ 1.75 g protein/8 oz serving | % by wt. |
| --- | --- |
| White Grape Juice Concentrate (68 brix) | 1.00 |
| Sugar | 8.00 |
| Soy Protein Isolate SUPRO 783 | 0.69 |
| 60:40 MCC/Low pH modified tapioca starch (FRIGEX HV) | 0.45 |
| PROCOL DP-130 Guar Gum | 0.15 |
| 50% Citric acid solution | 0.25 |
| Water | to 100% |

The MCC/low pH modified tapioca starch was dispersed in water followed by the addition of the Guar Gum and mixed for 15 minutes. The soy protein isolate was then added to the water and the mixture was heated to 155-160° F. and mixed for 15 minutes. Then, the sugar was added and mixed an additional 5 minutes. The product was then cooled to 100-110° F. The juice concentrate and citric acid solution was then added to the formulation and mixed for 5 minutes. Adjustments were then made, if needed, for any water loss. The product was then passed through a Niro homogenizer with a two-stage pressure of 2500 psi (2000 psi, 500 psi). Then, the product was pasteurized at 250° F. for 6 seconds. Finally, the mixture was cooled to 20° C. and filled aseptically. The product had a 24 hour reading pH of 4.17 and viscosity of 8.0 cP.

Example 31: Salad Dressing with 60/40 MCC/Low pH Modified Corn Starch

The 60/40 MCC/low pH modified corn starch (PURE GEL B994), was tested in the following formulation and procedure.

| Salad Dressing Formulation | % by weight |
| --- | --- |
| Water | 43.88 |
| Soybean Oil | 40.00 |
| Vinegar, 120 grain white distilled | 5.00 |
| Sugar | 4.00 |
| Cultured Buttermilk Powder | 3.50 |
| Salt | 2.00 |
| MCC/low pH modified corn starch 60/40 | 0.30 |
| Powdered Egg Yolk | 0.50 |
| Xanthan Gum | 0.25 |
| Garlic Powder | 0.18 |
| Onion Powder | 0.18 |
| Potassium Sorbate | 0.10 |
| Mustard Flour | 0.05 |
| Ground Black Pepper | 0.05 |
| Calcium Disodium EDTA | 0.01 |

25 g of the available water was removed to solubilize the potassium sorbate solution. Then the MCC/Starch was added to the rest of the available water and mixed using a Silverson mixer for 5 minutes. After which, a dry blend of Xanthan Gum and sugar was added and mixed for an additional 5 minutes or until uniformly incorporated. Then, a dry blend of the powdered egg yolks and mustard flour was added to the gum solution and allowed to mix for an additional 5 minutes. Then, the soybean oil was added slowly and mixed for 2 minutes. A dry blend of the rest of the ingredients, except the salt and vinegar was then added and mixed for an additional 2 minutes. The vinegar, preservative solution, and salt were then added and mixed for 2 minutes. The product was then deaerated, milled, and filled into containers.

The samples were stored in 8 oz jars and stored at refrigerated temperatures. The products were evaluated at 24 hr, 1 week, 2 week, 3 week, and 4 weeks for viscosity and stability. Viscosity was measured using a Brookfield RVT viscometer with the spindle #3 at 10 rpm. Viscosity results are documented as follows:

| 24 hours | 1 week | 2 weeks | 3 weeks | 4 weeks |
| --- | --- | --- | --- | --- |
| 6240 cps | 6130 cps | 6240 cps | 6280 cps | 6200 cps |

Example 32: Dairy Cooking Creams with 60/40 MCC/Low pH Modified Corn Starch

Dairy Cooking Creams—The 60/40 MCC/low pH modified corn starch (PURE GEL B994) was tested in the following formulation and procedure.

| Cooking Cream Formulation | % by weight |
| --- | --- |
| Skim Milk | 84.95 |
| Cream (40% Fat) | 12.50 |
| NOVATION 3300 | 2.00 |
| E471 from OLEON | 0.20 |
| MCC/low pH modified corn starch 60/40 | 0.35 |

A dry blend was prepared of the NOVATION 3300 (a tapioca based functional native starch obtainable from National Starch LLC with offices in Bridgewater, N.J.), E471 (radiamuls MG mono- and digylcerides of fatty acids obtainable from Oleon nv with headquarters in Ertvelde, Belgium), and 60/40 MCC/low pH modified corn starch. This dry blend was dispersed into a mix of the milk and cream and heated to 65° C. in a Stephan cooker. The product was mixed for 15 minutes while maintaining a temperature of 65° C. The mixture was then preheated to 75° C., and then homogenized at 120 bars (100 bar first stage/20 bar second stage). Then the product was sterilized at 142° C. for 3-5 seconds and cooled to 15° C. The product was filled aseptically and stored at 4° C. and 22° C. After one week, the product stored at 4° C. had a viscosity of 340.0 cps and a pH of 6.92. The product had a good uniform appearance as only one phase was observed. After one week, the product stored at 22° C. had a viscosity of 152.0 cps and a pH of 6.77. The product had a good uniform appearance as only one phase was observed.

Example 33: Gel Strength of MCC/Starch/Guar Gum Compositions

The gel strength properties of MCC/Starch, co-blended with Guar Gum, were also tested by a TA-Instruments rheometer (ARES-RFS3) with oscillatory strain sweep at 1 Hz and 20° C. temperature, gap size being 1.8 mm. The MCC/Starch samples were all made by co-processing a 60% MCC and 40% starch mixture that was subsequently spray-dried. The starch mixture included NATIONAL FRIGEX HV Tapioca starch, PURE GEL B994 Corn starch, and NOVATION 8300 Tapioca starch. The MCC/Starch were then co-blended with PROCOL DP-130 Guar Gum, at 75% MCC/Starch and 25% Guar Gum, and made into 2.6% solids content gel dispersions.

The gel strength results are shown in FIG. 1, which shows that MCC/Starch+Guar compositions made from chemically modified corn starch and tapioca starch were all showing excellent rheological properties, while the non-chemically modified Tapioca starch showed unacceptable gel properties. In comparison, a standard FMC colloidal AVICEL® CL611 (MCC/CMC) (microcrystalline cellulose and sodium carboxymethylcellulose obtainable from FMC BioPolymer with offices in Philadelphia, Pa.) was also shown as a control.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A method of making a water-dispersible composition comprising the steps:
   (1) coprocessing a microcrystalline cellulose wetcake and at least one starch by co-attrition to form an admixture comprising colloidal microcrystalline cellulose and said at least one starch; and
   (2) subsequently, drying the admixture;
   wherein: (i) the wetcake and starch are not coprocessed as a slurry and the admixture comprises less than 75% water by weight of the admixture in step (1); (ii) said starch comprises at least one hydroxypropylated starch; and (iii) the at least one starch is present in an amount of about 10-35% by weight of the admixture in step (1).

2. A method of making a composition according to claim 1, wherein the co-attrition comprises co-extrusion.

3. A method of making a composition according to claim 1 further comprising: blending the admixture of colloidal microcrystalline cellulose and at least one starch with an additional hydrocolloid.

4. A method of making a composition according to claim 3, wherein the additional hydrocolloid is a galactomannan.

5. A method of making a composition according to claim 4, wherein the galactomannan is guar gum.

6. A method of making a composition according to claim 1, wherein the hydroxypropylated starch is hydroxypropyl distarch phosphate.

7. A method of making a composition according to claim 1 further comprising the steps:
   (3) dispersing the admixture formed in step (2) in water with an additional hydrocolloid to form a dispersion; and
   (4) drying the dispersion to obtain a dried colloidal microcrystalline cellulose composition.

8. A method of making a composition according to claim 7, wherein the drying occurs by co-spray drying the dispersion.

9. A dried water-dispersible composition for use in a food application made by the process of claim 1.

10. A composition according to claim 9, wherein the coprocessed admixture has a greater negative surface charge when compared to microcrystalline cellulose particles alone.

11. A composition according to claim 10, wherein the negative surface charge prevents flocculation in an acidic environment.

12. A composition according to claim 9, wherein the dried water-dispersible composition imparts to a food product, at least one property selected from the group consisting of: protein stability; serum stability; heat stability; texture modification; foam stability; enhanced starch properties; or viscosity control.

13. A composition according to claim 9, wherein the food application is at least one selected from the group consisting of: an acidic pH beverage; a neutral beverage; a juice; a chocolate drink; a dairy product; a filling; a pudding; a baked good; a frozen dessert; a sauce; a dressing; a mayonnaise; a cultured product; and an aerated food product.

14. A method of making a composition according to claim 1, wherein the at least one hydroxypropylated starch comprises a modified starch selected from the group consisting of: hydroxypropyl distarch phosphate tapioca starch; hydroxypropyl tapioca starch; and mixtures thereof.

15. A composition for use in a food application comprising an admixture which comprises less than 75% water by weight of the admixture, obtained by a process comprising the step of coprocessing colloidal microcrystalline cellulose wetcake and at least one hydroxypropylated starch, wherein: (i) the wetcake and the starch are not coprocessed as a slurry; and (ii) as a result of coprocessing the colloidal microcrystalline cellulose and the starch, the colloidal microcrystalline cellulose is at least partially coated by the at least one hydroxypropylated starch; wherein the at least one hydroxypropylated starch is present in an amount of about 10-35% by weight of the admixture.

16. A composition for use in a food application according to claim 15, wherein the food application is at least one selected from the group consisting of: ice cream; cooking cream; sauce; and, dessert cream.

17. A composition according to claim 15, wherein said hydroxypropylated starch is hydroxypropyl di starch phosphate starch.

* * * * *